United States Patent [19]

Stephens

[11] Patent Number: 5,995,823
[45] Date of Patent: Nov. 30, 1999

[54] METHOD AND SYSTEM IN A WIRELESS COMMUNICATIONS NETWORK FOR PROVIDING TOLL RESTRICTIONS BASED ON THE GEOGRAPHIC LOCATION OF AN ORIGINATOR

[75] Inventor: Gary Boyd Stephens, Allen, Tex.

[73] Assignee: Nortel Networks Corporation, Montreal, Canada

[21] Appl. No.: 08/890,233

[22] Filed: Jul. 9, 1997

[51] Int. Cl.[6] .................................................. H04Q 00/00
[52] U.S. Cl. .......................................... 455/410; 455/565
[58] Field of Search ................................... 455/410, 411, 455/414, 565

[56] References Cited

U.S. PATENT DOCUMENTS

| | | | |
|---|---|---|---|
| 4,908,848 | 3/1990 | Hanawa | 455/565 |
| 5,343,512 | 8/1994 | Wang et al. | 455/410 |
| 5,625,668 | 4/1997 | Loomis et al. | 455/456 |
| 5,734,977 | 3/1998 | Sanmugam | 455/410 |
| 5,737,701 | 4/1998 | Rosenthal et al. | 455/411 |
| 5,781,863 | 6/1994 | Bales et al. | 455/456 |
| 5,835,857 | 3/1990 | Otten | 455/410 |
| 5,839,063 | 9/1995 | Lee | 455/410 |
| 5,884,193 | 2/1997 | Kaplan | 455/565 |

Primary Examiner—Nguyen Vo
Assistant Examiner—Duc Nguyen
Attorney, Agent, or Firm—John D. Crane; Andrew J. Dillon

[57] ABSTRACT

A method and system in a wireless communications network for restricting certain communication transactions to specific geographic areas in order to reduce the risk of communications fraud are presented. Initially, a list of communication transactions is stored such that the list includes communication transactions permitted to occur at each of a number of geographic locations. Thereafter, a communications transaction is initiated. In response to an initiation of the communications transaction, a geographic location of an originator of the communications transaction is determined. Next, the list of communication transactions is automatically scanned for communication transactions permitted to occur at the geographic location. If the communications transaction is not found among the list, the initiation of the communications transaction is thereafter terminated. Alternatively, if the communications transaction is found among the list, the communications transaction is thereafter permitted to continue. The geographic location can include a cell or cells maintained within the communications network.

9 Claims, 10 Drawing Sheets

METHOD AND SYSTEM IN A WIRELESS COMMUNICATIONS NETWORK FOR PROVIDING TOLL RESTRICTIONS BASED ON THE GEOGRAPHIC LOCATION OF AN ORIGINATOR

BACKGROUND OF THE INVENTION

1. Technical Field

The present invention relates, in general, to an improved wireless communications system. In particular, the present invention relates to an improved wireless communications system in which the risk of illicitly intercepted communications service is reduced.

2. Description of the Related Art

Cordless telephone systems are well-known in the prior art. A cordless telephone system generally includes a portable cordless handset and a cordless base station which is connected to a telephone company phone system by a landline. The cordless base station has an assigned landline telephone number that allows users to place and receive calls utilizing the cordless portable handset within a limited range of the cordless portable base station, such as within a home or office. However, due to the limited range present within such systems, a cordless portable handset provides the user with only relatively local radio-telephone communication.

Radio-telephone communication outside the range of a cordless telephone system also can be provided to users via cellular telephone systems. Cellular radio is a radiotelephone communications system that began to develop rapidly in the early 1980s. Basically, cellular radio is a small-scale, "cellular" version of the communication linkage provided by large radio-broadcasting systems. In a cellular telephone system, a geographical area is divided into smaller units, called cells. Each cell can have a radius of about 13 to 19 km (8 to 12 mi). In addition, each cell contains its own small radio transceiver. If necessary, each cell can be further subdivided into smaller cells. In this way, a honeycomb pattern of cells is formed such that each cell can repeatedly utilize the same range of radio frequencies without interfering with one another, so long as neighboring cells do not utilize precisely the same radio channels. Persons equipped with mobile communication devices such as small mobile cellular telephones can utilize this cellular telephone system in the same way that telephone calls are performed utilizing standard carriers.

Computerized switching is essential to the operation of cellular radio, so that when mobile-unit calls are switched from one cell to the next, the transfer in channels can take place without interruption, or at most a brief delay. The growth of electronic switching systems and the development of microprocessors have made such computerized switching possible. For each area to be covered by cellular radio, the U.S. Federal Communications Commission (FCC) licenses different types of organizations. For example, one type organization must be a telephone company, while another, a business that agrees to construct the necessary radio system. In recent years, the FCC has awarded newer frequency bands that also utilize cellular technology.

A cellular telephone system typically includes cellular subscriber units that may be mobile or portable, and cellular base stations that are connected to the public telephone company via one or more cellular switching networks. Each cellular subscriber has an assigned cellular telephone number that allows the user to place and receive calls within a widespread range of the cellular base stations, such as throughout a metropolitan area. Cellular telephone systems are thus based on a structure of associated cells. Each cell constitutes a specified geographic area that (a) is defined for a specific mobile communications system; and (b) has its own base station and a single controller interconnected with a public telephone network. Cellular telephone systems are particularly advantageous in providing cellular mobile service, a communications service that allow users to access a telephone network from a stationary or moving vehicle, via a combination of radio transmission and telephone switching. Cellular mobile services typically provide communications links to the user by segmenting a large geographic area into many smaller areas (i.e., cells). As a user passes from cell to cell, the cellular mobile service allows calls in progress to be handed over without interruption to adjacent base stations.

Users often desire to make toll calls via mobile communication devices, such as cellular telephones. In public switched telephone systems, including those that incorporate mobile cellular telephone systems, a toll is a charge for a connection to a central office or a user end instrument that is beyond a call originator exchange boundary. The amount of a toll (i.e., toll call) is usually based on various factors, such as distance, the number of exchanges utilized, duration of the call, time of day, locations of call originator and call receiver, type or class of service, and extent of utilization. Although a user may desire to make a toll call to a cellular telephone, the carrier (i.e., the company handling the cellular telephone call) may be exposed to fraud if it allows a toll call to proceed, particularly in long-distance dialing cases. Cellular signals can be easily intercepted because of the availability of cellular networks over wide geographic areas.

Several solutions have been proposed to handle the potential illicit interception of cellular telephone service and resulting fraudulent actions by unscrupulous intermediaries. The first solution is simply to permit no toll calls at all. This solution is limited because it does not allow flexibility for users or subscribers of mobile cellular telephone services. This solution is thus unrealistic and unprofitable for cellular carriers to implement. Another solution is to allow a mobile user to make local toll calls only, but not international toll calls. This solution reduces the exposure to fraud somewhat. However, the carrier and the user are still exposed to fraud derived from local phone calls. Such a method does not allow a carrier to generate revenue from legitimate mobile customers who desire to make toll calls.

Another solution is to allow a mobile cellular telephone user to make toll calls, but require some sort of an identification number, such as a PIN number, when placing a toll call. Again, exposure to the risk of fraud is reduced somewhat, but exposure remains, because the PIN number can be recorded by a fraudulent user anytime the real user of a mobile communications device places a toll call. Such a solution also requires an extra undesirable effort on the part of the user of the mobile communications device to avoid illicit interception of the PIN number.

It can be appreciated from the foregoing that a need exists for a method and system in a cellular network that allows cellular telephone users to be able to make toll calls, while reducing the risk of exposure to fraudulent cellular network interceptors. Such a method and system, if implemented successfully, would limit the ability of individuals to illicitly steal the cellular telephone service of an originating cellular telephone user. For example, when an originating cellular telephone user makes a cellular telephone call, the user may be prompted, depending on the requirements of a particular cellular telephone company, to input an account number or password. The cost of the cellular communications transaction is then credited to this account number, to which the user must later pay funds.

If, however, the cellular telephone call is intercepted illicitly at the moment the user punches the account number into the cellular telephone keypad, the account number may then be in effect "stolen," and the user or cellular telephone company forced to recoup the cost of any losses suffered as a result of this theft. Such an illicit operation is often referred to in the art of cellular telephone technology as "cloning." In this situation, the illicit interceptor (i.e., cloner) utilizes illicitly accessed mobile cellular telephone identification information in an effort to fool the cellular telephone system into the belief that the cloner is the "real" mobile cellular telephone, when in fact the cloner is not. The fraud perpetrated on the mobile cellular telephone user or cellular carrier is that the cloner pretends to be the mobile cellular telephone user placing the toll call. Either the mobile cellular telephone user or the cellular carrier will have to pay the charges related to the toll call made by the cloner.

Thus, it can be seen that a need exists for a method and system that would prevent or at the very least, lessen the chances of such an unfortunate event occurring. With respect to the foregoing need, the inventor is aware of no attempts to date which have been directed toward satisfying the foregoing identified need.

SUMMARY OF THE INVENTION

It is therefore one object of the present invention to provide an improved wireless communications telephone system.

It is therefore another object of the present invention to provide an improved cellular telephone system.

It is yet another object of the present invention to provide an improved cellular telephone system in which the risk of illicitly intercepted cellular telephone service is reduced.

It is still another object of the present invention to provide an improved cellular telephone system in which the risk of illicitly intercepted cellular telephone service is reduced by providing toll restrictions that are based on the geographic location of originating cellular telephone users.

The above and other objects are achieved as is now described. A method and system in a wireless communications network for restricting certain communication transactions to specific geographic areas in order to reduce the risk of communications fraud are presented. Initially, a list of communication transactions is stored such that the list includes communication transactions permitted to occur at each of a number of geographic locations. Thereafter, a communications transaction is initiated. In response to an initiation of the communications transaction, a geographic location of an originator of the communications transaction is determined. Next the list of communication transactions is automatically scanned for communication transactions permitted to occur at the geographic location. If the communications transaction is not found among the list, the initiation of the communications transaction is thereafter terminated. Alternatively, if the communications transaction is found among the list, the communications transaction is thereafter permitted to continue. The geographic location can include a cell or cells maintained within the communications network.

BRIEF DESCRIPTION OF THE DRAWINGS

The novel features believed characteristic of this invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
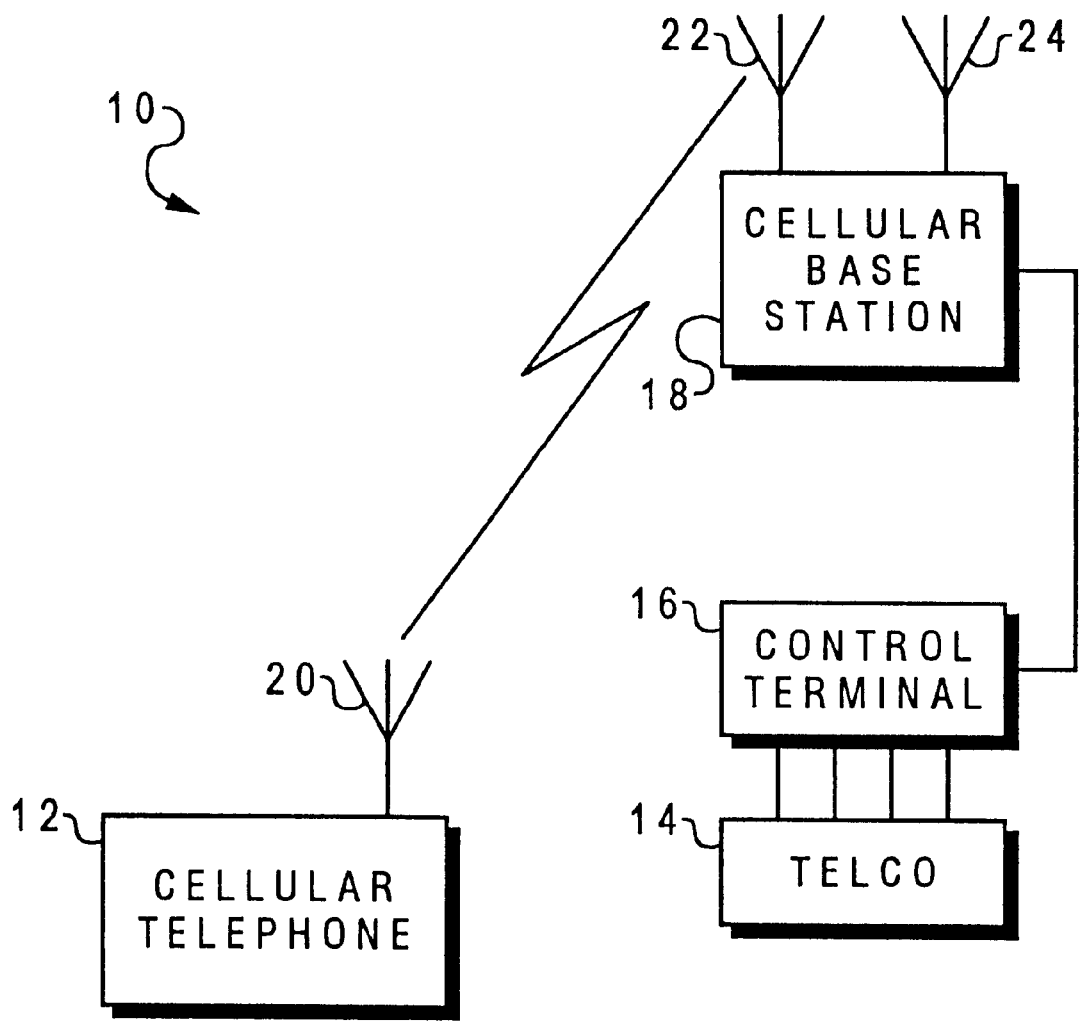
FIG. 1 illustrates a block diagram illustrative of a cellular telephone system in which a preferred embodiment of the present invention may be implemented.

With reference now to the figures and in particular with reference to FIG. 1, there is depicted a block diagram of a cellular telephone system 10 in which a preferred embodiment of the present invention may be implemented. The cellular telephone system 10 depicted in FIG. 1 includes a telephone company phone system (TELCO) 14, connected by telephone landlines to a control terminal 16 which, in turn, is coupled, also by telephone landlines, to a cellular base station 18 that is geographically located in a cell of a mobile cellular telephone system.

Cellular telephone 12 communicates with cellular base station 18 via antennas 22 and 24, which may be implemented as telescopic whip antennas that can be extended or retracted (i.e., lengthened or shortened), by being constructed in the form of overlapping concentric cylinders that slide inside of each other and make electrical contact with each other. It will be appreciated by those skilled in the art that such antennas are, of course, only examples of antennas that can be utilized with a cellular telephone system such as cellular telephone system 10. A wide variety of other antennae can also be utilized in conjunction with a wireless communications system such as cellular telephone system 10. The landlines utilized with cellular telephone system 10 are lines that can be placed in areas on land or inland waterways, and can include twisted-pair lines, coaxial cables, and fiber optic cables utilized in overhead, direct buried, underground, microwave, and satellite applications.

Additional cellular base stations may be located throughout a geographic area to provide telephone service to cellular telephones 12. Cellular base station 18 incorporates both a receiver antenna 22 and a transmitter antenna 24 for communicating with cellular telephones 12. Cellular telephone 12 may be a mobile-unit (i.e., mobile communications device) installed in a vehicle, a transportable unit which is a mobile-unit and battery installed in a carrying case, or a hand-held portable unit. Cellular telephone 12 includes an antenna 20 for the cellular radio channels. In the United States, the cellular radio channels are in the frequency band from 824–894 MHz. More particularly, in the United States, a total bandwidth of 50 MHz is allocated to the cellular mobile service, the 50 MHz distributed between 824 MHz and 849 MHz, and between 869 MHz and 894 MHz of the frequency spectrum. Also, recently the FCC has auctioned off bandwidths in the 1.9 GHz range. All of these bands can be utilized in accordance with a preferred embodiment of the present invention.

Figure 2:
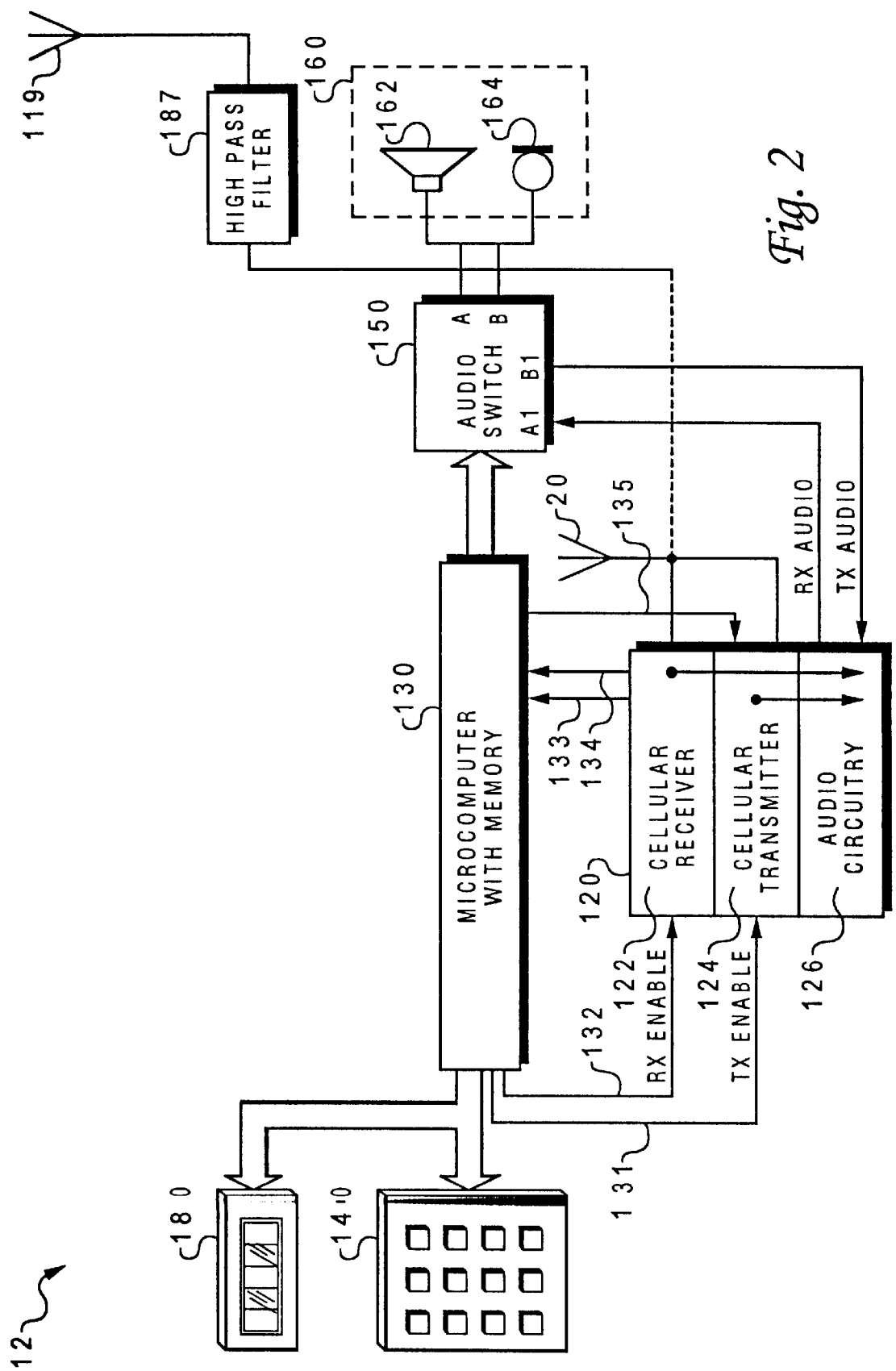
FIG. 2 depicts a block diagram illustrative of a cellular telephone which may be implemented in accordance with a preferred embodiment of the present invention.

FIG. 2 is a block diagram of a cellular telephone 12 which may be implemented in accordance with a preferred embodiment of the present invention. Cellular telephone 12 includes antenna 20, cellular telephone transceiver 120, microcomputer 130, keypad 140, display 180, audio switch 150, and handset 160, including speaker 162 and microphone 164. Microcomputer 130 is a computer built around a single chip microprocessor. Less powerful than a minicomputer or a mainframe computer, microcomputer 130 is nevertheless capable of complex tasks involving the processing of logical operations. Microcomputer 130 includes a central processing unit (CPU) (i.e., not shown), which is the computational and control unit of microcomputer 130, and which interprets and executes instructions for cellular telephone 12.

Alternatively, cellular telephone transceiver 120 may be coupled to a single antenna 119 in place of antenna 20 and by way of high-pass filter 187, respectively High-pass filter 187 is utilized to filter only those signals which fall within a frequency range utilized by cellular telephones in the United States. High-pass filter 187 can be further modified to allow for cellular telephone frequency ranges of countries other than the United States. Specific design parameters of such a high-pass filter are left to the discretion of the manufacturer of a cellular telephone such as cellular telephone 12. Display 180 can be any type of display device which visually presents data to a cellular telephone user. Display devices such as a light-emitting diode panel or liquid crystal display can be utilized to implement display 180. Keypad 140 is a set of keys that are mounted on a small keyboard and are dedicated to a specific purpose, such as inserting numbers. Keypad 140 is preferably modeled on the standard telephone keypad.

Control signals 131 TX ENABLE and 132 RX ENABLE of microcomputer 130 enable cellular transmitter 124 and cellular receiver 122, respectively. In addition to control signals 131 and 132 to cellular transceiver 120, microcomputer 130 also monitors control signals 133 RSSI, 134, RX DATA, and 135 TX DATA for detecting signal strength, for detecting receive data and for sending transmit data, respectively, utilized in operation of cellular transceiver 120. Note that the example depicted in FIG. 2 merely describes one form of a cellular telephone that can be utilized in accordance with the method and system of the present invention. One skilled in the art will appreciate that other types of cellular telephone systems can be implemented with a preferred embodiment of the present invention, as long as the particular cellular telephone system utilized allows for toll call restrictions based upon origination from a geographic location.

Figure 3:
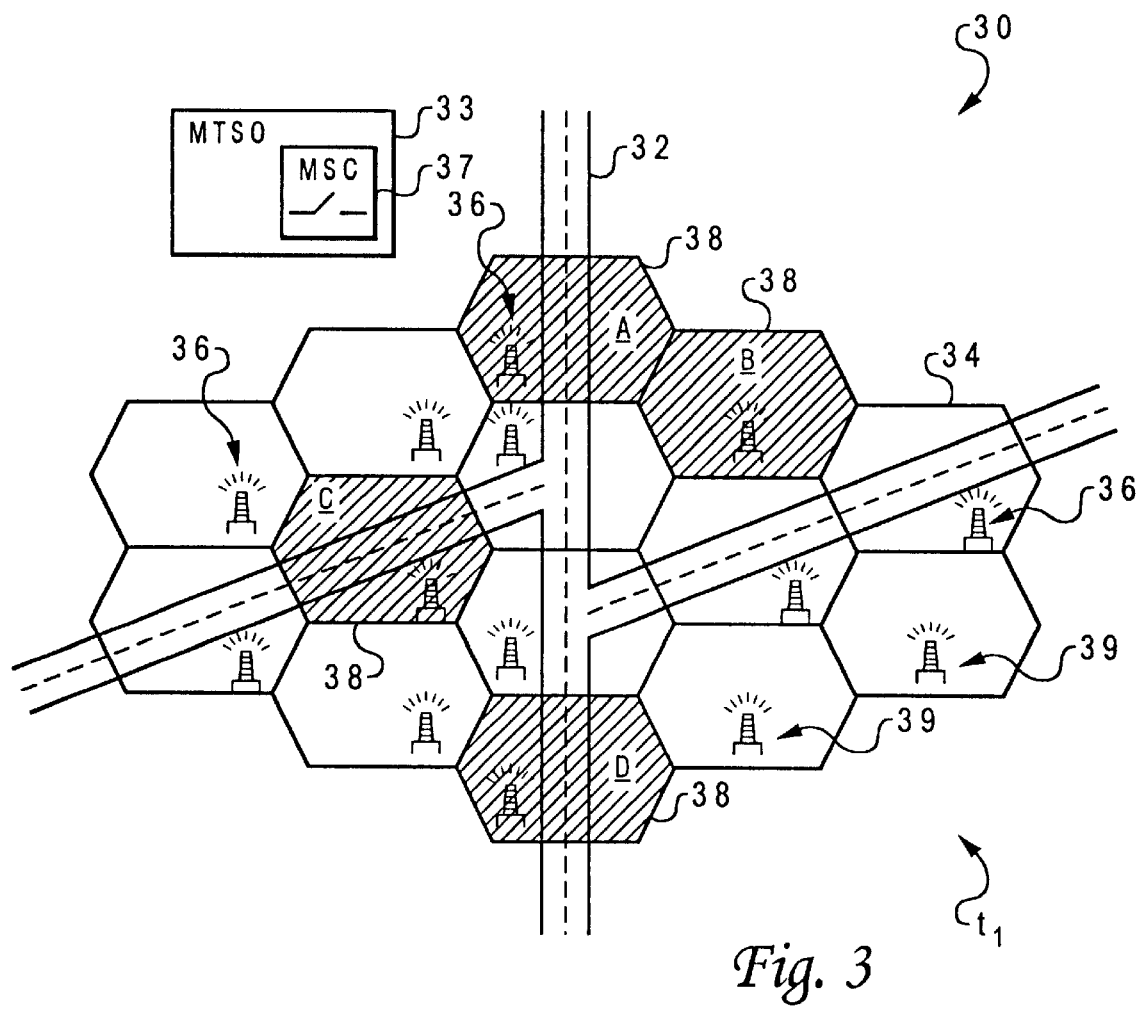
FIG. 3 illustrates a pictorial representation illustrative of a cellular telephone system in which a preferred embodiment of the present invention may be implemented.

FIG. 3 depicts a pictorial representation illustrative of a cellular telephone system 30 in which a preferred embodiment of the present invention may be implemented. Cellular telephone system 30 is composed of a variety of cells 34. Each cell encompasses a specified geographic area. Each geographic area has its own base station 36 and a single controller (not shown) interconnected with a public telephone network. Each cell 34 sits adjacent another cell to create a honeycomb pattern of cells. Cells 34 can cover a large metropolitan area. Each cell 34 can have a radius of about 13 to 19 km (8 to 12 miles), depending upon the strength of each base station 36.

Such specific distances, however, are not necessary limitations of the present invention. Cells can have ranges from as low as several hundred feet up to approximately 25 miles in radius. The specific numbers described herein are for demonstrative purposes only and are not necessary limitations of the present invention. Although not depicted in FIG. 3, each cell 34 can be further subdivided into still smaller cells. In this way, the honeycomb pattern of cells 34 can repeatedly utilize the same range of radio frequencies without interfering with one another, so long as neighboring cells 34 do not utilize precisely the same radio channels.

Although not shown in FIG. 3, each cell 34 can include six directional antennas, centrally located in each cell 34, each radiating into a sixty degree section of each cell. A plurality of cells 34 are combined to form cellular telephone system 30 covering a particular geographic area. This cellular system enables mobile cellular telephone traffic to communicate with landline telephone networks and other mobile cellular telephones while moving through the geographic area. Each cell 34 also has a number of frequencies, transmitted by low power transmitters, assigned to it that cannot be utilized in adjacent cells because of frequency interference problems. Due to the low power of each cell's transmitter, however, the same frequency can be re-utilized in other cells, referred to as co-channel cells in the same metropolitan area.

Cellular telephone system 30 is an example of a cellular mobile service, a communications service that allows a user to access the public telephone network from a stationary or moving vehicle, and which is based on a combination of radio transmission and telephone switching. Individuals with small mobile communication devices such as mobile cellular telephones can utilize this system in the same way that telephone calls are made utilizing standard carriers. The cellular mobile service thus provides a communications link to the user by segmenting a particular geographic area into smaller areas (i.e., cells). Cellular telephone system 30 includes cellular subscriber units that may be mobile or portable. Each base station 36 is connected to the public telephone company (i.e., TELCO) via one or more cellular switching networks (not shown). Each cellular subscriber has an assigned cellular telephone number that allows the user to place and receive calls within a widespread range of each base station 36, such as throughout a metropolitan area.

During a cellular telephone call, when a mobile cellular telephone moves from one cell to another, it must be handed-off to the next cell in order to continue communicating. A problem is created when a mobile subscriber travels from one cell to another during a cellular telephone call. Since adjacent areas do not utilize identical radio channels, a call must either be dropped or transferred from one radio channel to another when a user crosses the line between adjacent cells. Because dropping the call is unacceptable, the process of "handoff" solves this problem. Handoff occurs when the mobile telephone network automatically transfers a call from radio channel to radio channel as a mobile crosses adjacent cells.

During a cellular communications transaction, two parties to the cellular communications transaction share a single voice channel (i.e., transmit and receive are on a single voice channel). If the two parties happen to be mobiles, they utilize two voice channels. If they did not utilize two voice channels, they would interfere with one another. When the mobile-unit moves out of the coverage area of a given cell site, the reception becomes weak. At this point, the cell site requests a handoff. The cellular telephone system then switches the call to a stronger-frequency channel in a new site without interrupting the call or alerting the user. The call continues as long as the user is talking, and the user may not notice the handoff at all. In most cellular telephone systems, however, during a handoff procedure, the signal usually becomes temporarily weak. The signal quality improves abruptly when the handoff is completed. Cellular telephone users also often experience a short mute period (i.e., no voice) when the mobile cellular telephone transfers to a new frequency.

A road 32, such as a metropolitan highway, extends through cells 34 contained within cellular telephone system 30. Thus, a user can travel along road 32 through cells 34 and while travelling, perform mobile cellular telephone operations. Toll calls may only be made by a user within restricted cells 38. Each restricted cell 38 has its own base station. When a user is travelling along road 32 and desires to place a toll call utilizing a mobile cellular telephone, the user is allowed to do so within a restricted cell 38. The geographic location of the mobile cellular telephone is utilized to determine whether or not a restriction should be placed on a toll call.

The geographic location of the mobile can be determined by a number of methods. For example, signal strength triangulation (i.e., utilizing directional antennae) is one method that can be utilized to determine the exact geographic location of the mobile cellular telephone. Signal strength comparison (i.e., utilizing signal strengths and a radio frequency propagation chart) is another method that can be utilized to determine the geographic location of mobile cellular telephone. Signal timing, which takes advantage of digital technology, is another method that can be utilized to determine the geographic location of the mobile cellular telephone. In signal timing methodology, digital technologies take advantage of the spacing of timing to determine the distance a mobile is located from a specific geographic reference point. Once the geographic location of the mobile is determined, this geographic location also can be utilized to restrict toll originations to an even smaller area than a cell, when desirable. It can be appreciated by one skilled in the art that although a cell, as described herein, is a unit of granularity utilized to determine an area in which toll calls can be restricted, such an area can be smaller, depending upon the desire of the designers of a system implementing a preferred embodiment of the present invention.

Specific types of cells 34 only allow certain types of calls to made within the cell area. For example, cells 39, as depicted in FIG. 3, are specific types of cells 34 in which toll calls cannot be made. In FIG. 3, restricted cells 38 are additionally identified as cells A, B, C and D. The areas in which the toll calls are allowed to take place can be periodically altered. For example, in an area in which cellular telephone fraud is high these areas can be shifted and rearranged so as to confuse any would-be fraudulent interceptors of the cellular telephone service. In particular, restricted cells 38 can be periodically altered to confuse any would-be illicit interceptors of cellular telephone signals. Cellular telephone system 30 further includes a mobile telephone switching office (MTSO) 33, a central office for mobile switching in cellular telephone system 30. Restrictions can also be made based on the time of day or time of week that a telephone call is made in a given restricted area. For example, in some geographical locations, illicit telephone interceptions may occur at a higher rate during weekday afternoons. Thus, during weekday afternoons, toll calls would be restricted within the restricted cells or restricted areas in accordance with a preferred embodiment of the present invention.

MTSO 33 houses a mobile switching center (MSC) 37, and fielded monitoring and relay stations (not shown) for switching calls from cell sites to wireline central offices such as (TELCO) 14 depicted in FIG. 1, or a public switched telephone network (PSTN), made up of local networks, exchange area networks, and long-haul networks that interconnect telephones and other communication devices on a worldwide basis. MSC 37 can control system operations in analog cellular networks. For example, MSC 37 can control calls, track billing information, and locate cellular subscribers. MSC 37 is thus a switch that provides services and coordination between external networks and mobile cellular telephones utilized in networks such as cellular telephone system 30.

Figure 4:
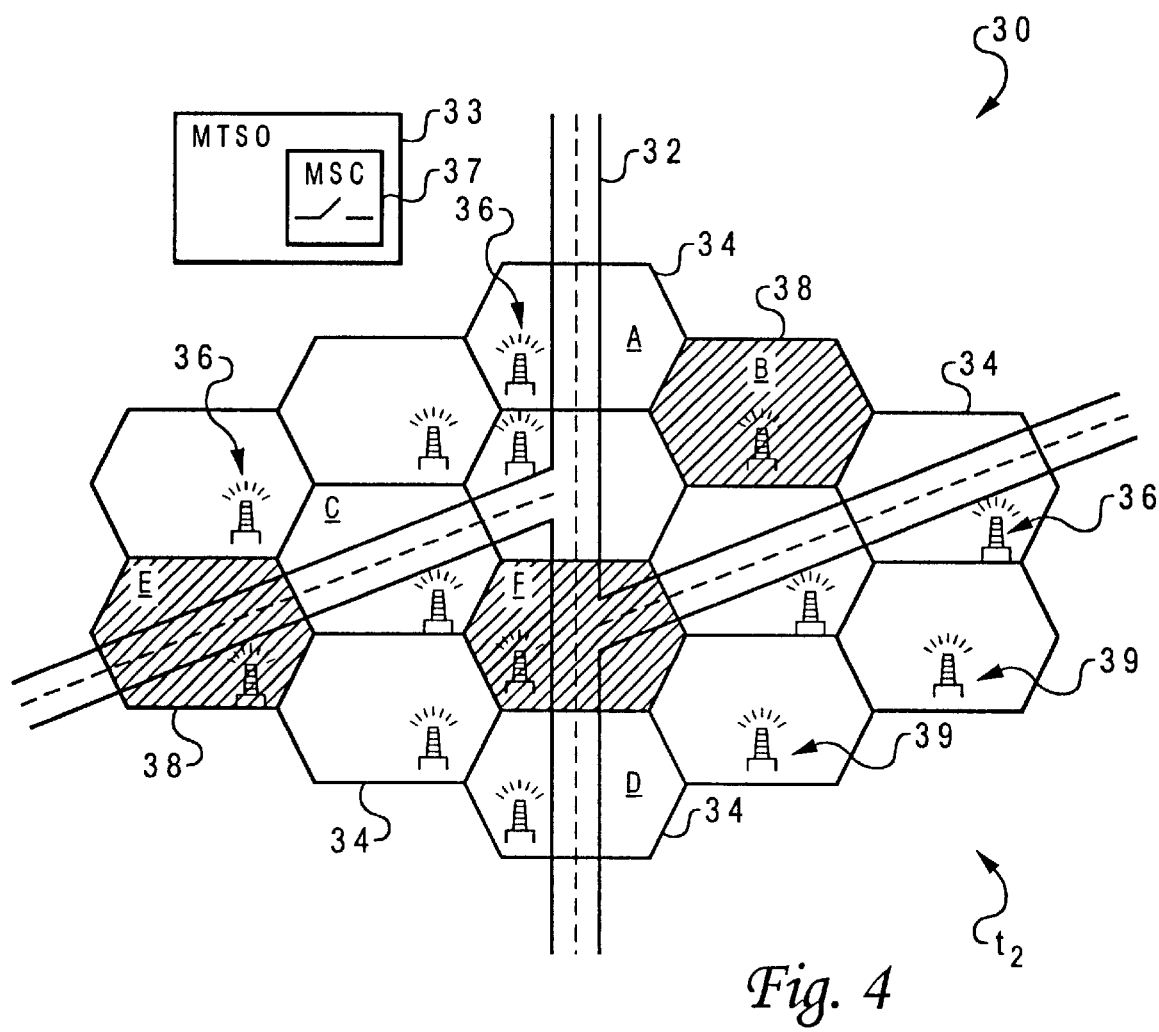
FIG. 4 depicts a pictorial representation illustrative of a cellular telephone system in which a preferred embodiment of the present invention may be implemented.

In FIG. 3 and FIG. 4, like parts are indicated by like numbers. FIG. 4 depicts a pictorial representation illustrative of a cellular telephone system in which a preferred embodiment of the present invention may be implemented. FIG. 3 depicts a cellular telephone system at time $t_1$. FIG. 4, on the other hand, specifically shows a different organization of restrictions at time $t_2$. At time $t_2$, the restricted cells 38 are identified as cells B, F, and E. Cells A, C, and D, which were formerly restricted cells at time $t_1$ have become unrestricted cells at time $t_2$. Thus, in FIG. 4, cell A is a cell 34 that has become unrestricted. Cell E, formerly an unrestricted cell is now a restricted cell 38.

Figure 5:
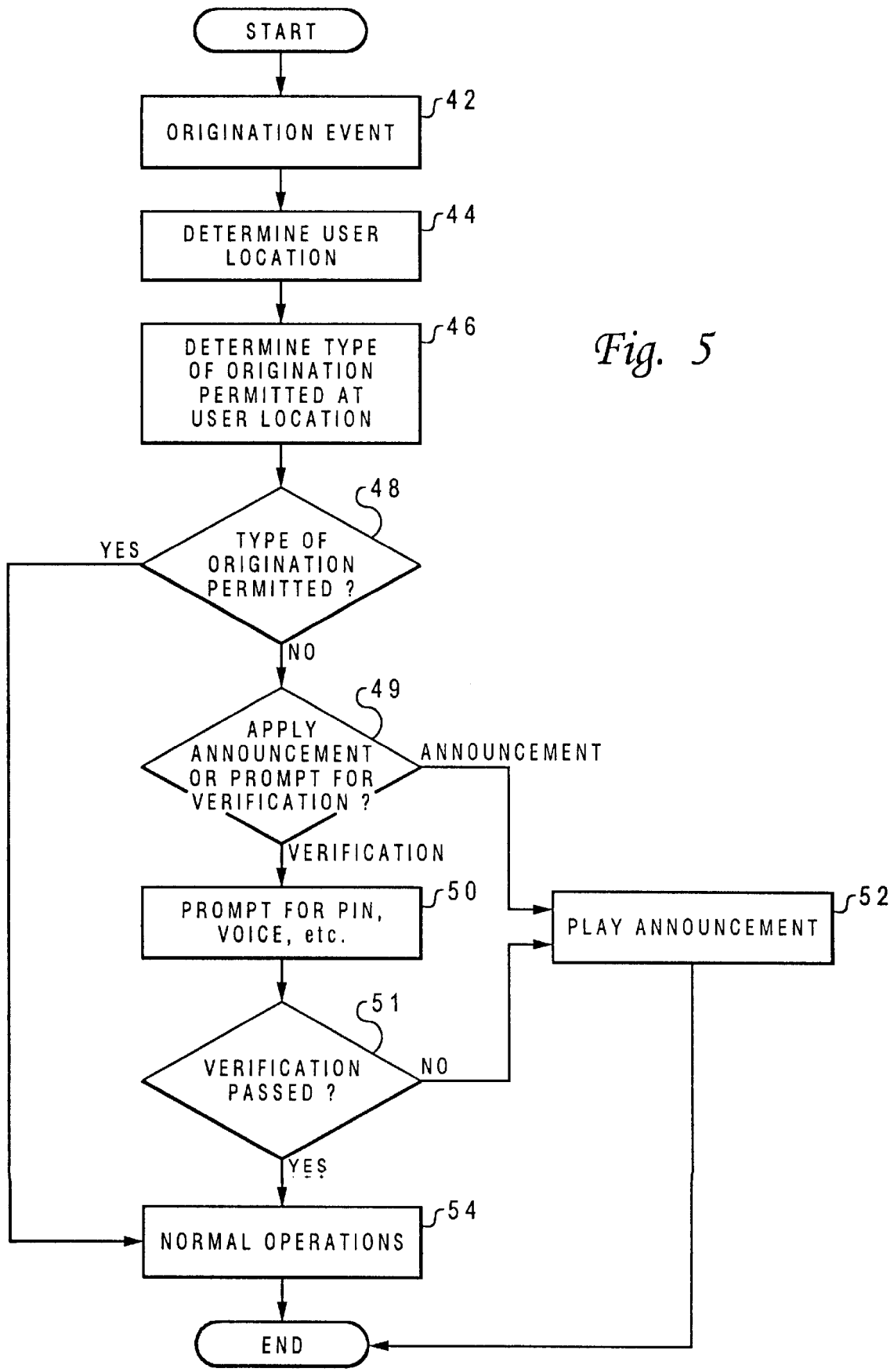
FIG. 5 illustrates a flow chart of operation illustrative of a method for restricting toll calls based on the geographic location of an originator in accordance with a preferred embodiment of the present invention.

FIG. 5 illustrates a flow chart of operations 40 illustrative of a method for restricting toll calls based on the geographic location of an originator in accordance with a preferred embodiment of the present invention. It can be appreciated by those skilled in the art that FIG. 5 presents a self-consistent sequence of steps leading to a desired result. The steps are those requiring physical manipulation of physical quantities. Usually, although not necessarily, these quantities take the form of electrical or magnetic signals capable of being stored, transferred, combined, compared, and otherwise manipulated. It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention;

the operations are machine operations. Useful machines for performing operations of a preferred embodiment of the present invention include data-processing systems such as general purpose digital computers or other similar devices.

In all cases, the distinction between the method of operations in operating a computer, and the method of computation itself, should be borne in mind. The present invention relates to method steps for processing electrical or other (e.g., mechanical, chemical) physical signals to generate other desired physical signals, and can be implemented via a computer such as microcomputer 130. However, it is not necessary to maintain within a computer memory of a cellular telephone, instructions implementing these method steps. These instructions can be maintained within a computer memory located at a cellular telephone base station or at a central broadcasting center from which base stations receive instructions. Implementation of the method described herein is left to the discretion of a particular cellular telephone system designer.

Thus, as illustrated at block 42, an origination event occurs. An "event," in the context of the method described herein, is an occurrence or happening, usually significant to the performance of a function, operation, or task. Thus, an origination event is an event in which an originator triggers a cellular communications telephone call via a mobile cellular telephone. The originator is an initiator of a communications transaction via a wireless communications device, such as a mobile cellular telephone. In the case of cellular telephone system, initiation of a communications transaction (e.g., a mobile cellular telephone call) occurs as the result of a mobile cellular telephone user pressing telephone keys on a cellular telephone keypad.

As depicted at block 44, the geographic location of the originator can be determined according to any one of the geographic location techniques mentioned earlier (e.g., signal strength, GPS satellite, etc). As described at block 46, once the geographic location of the originator has been determined, the type of origination allowed for that user at that particular geographic location, must be determined.

Particular cells are designated in which only certain types of calls can be performed within the geographic areas encompassed by such cells. For example, if the originator is positioned in a restricted area, such as restricted cell 38 depicted in FIG. 3 and FIG. 4, then only certain types of calls can be made within the geographic area encompassed by restricted cell 38. In the example shown in FIG. 3 and FIG. 4, toll calls can only be made within restricted cells 38. Once it is determined that only specific types of calls can be made in the geographic location in which the originator is located, then as described at block 48, a test is performed to determine the type of call placed by the originator. If the toll call made by the originator is permitted to occur in the geographic location in which the originator is located, then as illustrated at block 54, normal mobile cellular telephone operations continue.

If the toll call initiated by the originator is not permitted to occur in the cell in which the originator is located, then as depicted at block 49, a test is performed to determine whether to apply an announcement or prompt the originator for verification. If an announcement is applied, then as depicted at block 52, the announcement is played and the process thereafter ends. However, if the user is prompted for verification, then as illustrated at block 50, the user is prompted for identification, such as a pin number. The call can also be routed to an operator who requests verification information from the originator such as, for example, the maiden name of the originator's mother. Alternatively, a voice print can be made of the originator's voice to determine whether or not the user placing the phone call is in fact the originator.

As described at block 51, if the verification is approved, then as depicted at block 54, the process continues normally, and the call is permitted to proceed. Although not shown in FIG. 5, additional tests can be utilized to place restrictions on such calls. For example, it may be desirable in a preferred embodiment of the present invention to place, in addition to the geographic restrictions described herein, time-of-day restrictions. For example, certain calls may only be allowed to proceed during the day at particular geographic locations, but not at night.

If verification is not approved, then as described at block 52, the user is then informed by way of an announcement that the type of call desired may not be performed at that particular geographic location, or that the user may attempt to make the call again at a different location. An announcement can be made to the user by way of a visual display, such as display 180 depicted in FIG. 2. The intent of the test performed, as depicted at block 51, is to provide continued service with as little interruption as possible. The test depicted at block 51 is a precaution that provides verification where it is suspected that the originator placing the toll call may in fact not be the real user.

The steps depicted in block 49, block 50, block 51, block 52, and block 54 can be summarized as follows: The originator of the toll call is prompted to enter verification data. Next, the verification data is tested for authenticity. If as a result of testing the verification data for authenticity, the verification data is not found to be authentic (i.e., wrong verification data), initiation of the toll call is terminated. An announcement indicating that the wrong verification data (e.g., pin number, voice print, etc.) has been entered can be played for the originator. However, if as a result of testing the verification data for authenticity, the verification data is found to be authentic, the toll call is permitted to continue.

It can be appreciated by one skilled in the art that the methods or processes described herein can be implemented as a program product, such as a control program residing within a computer memory and containing instructions that when executed on a CPU, will carry out the operations depicted in the logic flow charts described herein. It is important to note that, while the present invention can be described in the context of a fully functional computer system, those skilled in the art will appreciate that the present invention is capable of being distributed as a program product in a variety of forms, and that the present invention applies equally, regardless of the particular type of signal-bearing media utilized to actually carry out the distribution. Examples of signal-bearing media include: recordable-type media, such as floppy disks, hard-disk drives and CD ROMs, and transmission-type media, such as digital and analog communications links.

Figure 6:
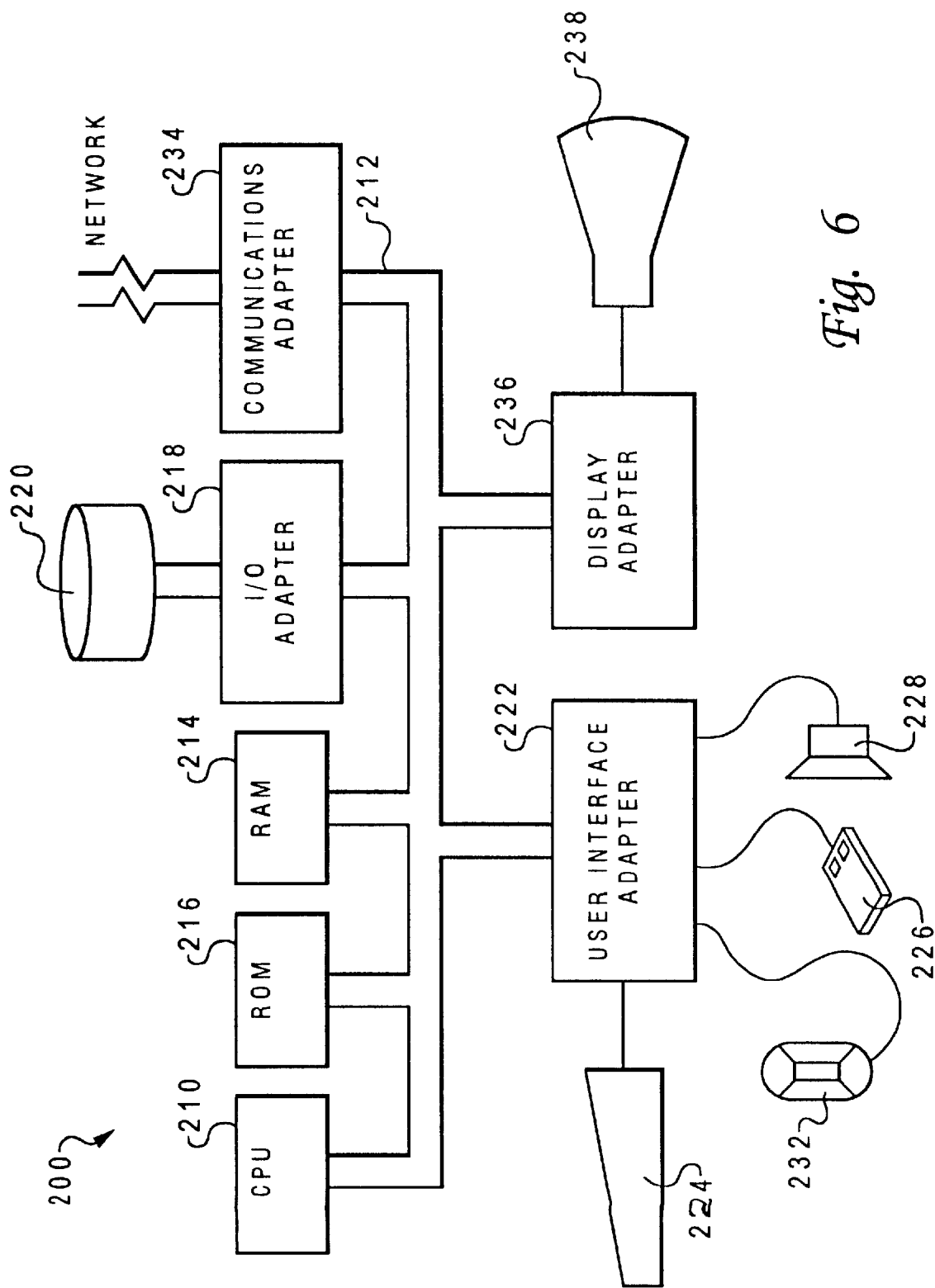
FIG. 6 depicts a block diagram illustrative of a data-processing system in which a preferred embodiment of the present invention can be implemented.

FIG. 6 depicts a block diagram illustrative of a data-processing system 200 in which a preferred embodiment of the present invention may be implemented. Data-processing system 200 may be coupled to a base station or central broadcasting station of a cellular telephone system such as the cellular telephone systems described in the text related to FIG. 1 to FIG. 4. Data-processing system 200 has a central processing unit (CPU) 210, such as a microprocessor. CPU 210 is coupled to various other components by system bus 212. Read-only-memory (ROM) 216 is coupled to system bus 212 and includes a basic input/output system ("BIOS") that controls certain basic functions of the data-processing system 200.

Random-access-memory ("RAM") 214, I/O adapter 218, and communications adapter 234 are also coupled to system bus 212. I/O adapter 218 may be a small computer system interface (SCSI) adapter that communicates with a disk storage device 220. Communications adapter 234 interconnects bus 212 with an outside network enabling the data-processing system to communicate with other such systems. Input/output devices are also connected to system bus 212 via user-interface adapter 222 and display adapter 236. Keyboard 224, trackball 232, mouse 226 and speaker 228 are all interconnected to bus 212 via user-interface adapter 222. Display monitor 238 is connected to system bus 212 by display adapter 236. In this manner, a user can input data to the system via keyboard 224, trackball 232, or mouse 226, and, likewise, can receive output from the system via speaker 228 and display monitor 238. A computer operating system can be utilized to coordinate the functions of the various components depicted in FIG. 6.

Preferred implementations of the invention include implementations as a computer system programmed to execute the method or methods described herein, and as a program product. According to the computer system implementation, sets of instructions for executing the method and methods are resident in RAM 214 of one or more computer systems configured generally as described above. Until required by the computer system, the set of instructions may be stored as a computer-program product in another computer memory, for example, in disk drive 220 (which may include a removable memory such as an optical disk or floppy disk for eventual utilization in disk drive 220).

The computer-program product can also be stored at another computer and transmitted when desired to the user's workstation by a network or by an external communications network. One skilled in the art can appreciate that the physical storage of the sets of instructions physically changes the medium upon which it is stored so that the medium carries computer-readable information. The change may be electrical, magnetic, chemical, or some other physical change. While it is convenient to describe the invention in terms of instructions, symbols, characters, or the like, the reader should remember that all of these and similar terms should be associated with the appropriate physical elements. Thus, a method for implementing the steps depicted in FIG. 5, can be accomplished with a computer-aided device. In such a method, data stored in a memory unit of a data-processing system such as data-processing system 200, can represent steps in a method for implementing a preferred embodiment of the present invention.

Figure 7:
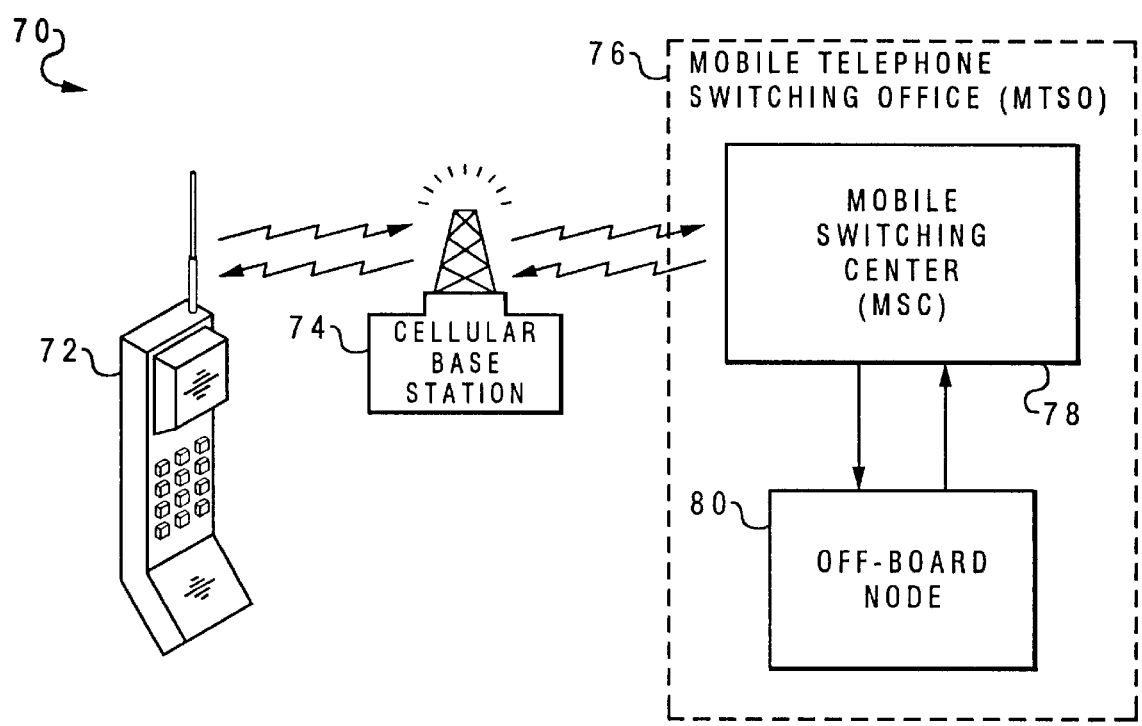
FIG. 7 illustrates a block diagram illustrative of a mobile switching center and off-board node in a cellular telephone system in which a preferred embodiment of the present invention may be implemented.

FIG. 7 illustrates a block diagram illustrative of a mobile switching center 78 and an off-board node 80 in a cellular telephone system 70 in which a preferred embodiment of the present invention may be implemented. Cellular telephone system 70 is analogous to cellular telephone system 10 depicted in FIG. 1 and cellular telephone system 30 depicted in FIG. 3 and FIG. 4. Cellular telephone system 70 includes a mobile cellular telephone 72, which is analogous to cellular telephone 12 depicted in FIG. 2. Cellular base station 74 is analogous to the base stations described herein.

Mobile telephone switching office (MTSO) 76 is a central office for mobile switching within cellular telephone system 70. MTSO 76 houses the mobile switching center (MSC) 78, and fielded monitoring and relay stations (not shown) for switching calls from cell sites to wireline central offices such as (TELCO) 14 depicted in FIG. 1, or a public switched telephone network (PSTN), made up of local networks, exchange area networks, and long-haul networks that interconnect telephones and other communication devices on a worldwide basis. MSC 78 can control system operations in analog cellular networks. For example, MSC 78 can control calls, track billing information, and locate cellular subscribers. MSC 78 is thus a switch that provides services and coordination between mobile users (i.e., originators) and external networks.

According to a preferred embodiment of the present invention, when an originator utilizing mobile cellular telephone 72 attempts to initiate a cellular communications transaction, a signal is transmitted from an antenna of cellular telephone 72 to base station 74, which, in turn, transmits the signal to MSC 78. MSC 78 calculates the geographic location of the originator based on the geographic location of cellular telephone 72. MSC 78 maintains a trigger that upon receipt of toll call confirmation, transfers a request to off-board node 80 to look-up a list of toll calls allowed to occur within the cell in which in the originator is located.

For example, an originator may reside in a 512 telephone area code. The originator commonly calls a 714 telephone area code from cells located within the boundaries of the 512 telephone area code. The area code 714 can be maintained as one item in the list of toll calls allowed to proceed from that cell. However, a telephone area code not included in that list (e.g., a telephone area code of a foreign country) results in the return of instructions to MSC 78 to restrict toll calls in that cell. In this case, the originator can receive a message or announcement on cellular telephone 72 indicating that the call cannot be processed. MSC 78, together with off-board node 80, perform the operations described at block 48 and 50 as depicted FIG. 5. MSC 78 can include a data-processing system such as the one depicted in FIG. 6. Such a data-processing system can control switching activities and transfer data requests, via external bus lines, to off-board node 80.

Figure 8:
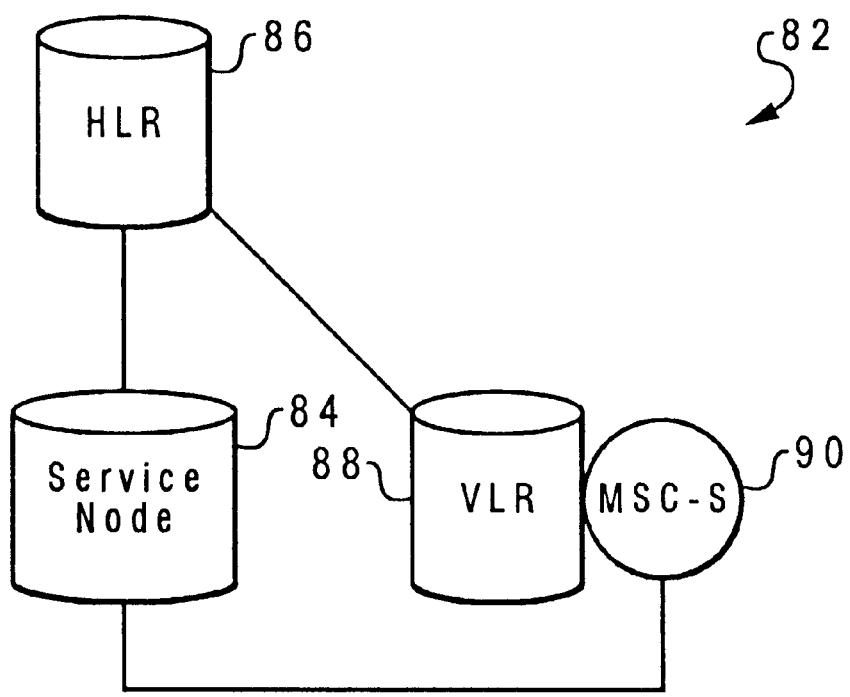
FIG. 8 depicts a block diagram illustrative of a subscription capability of a cellular telephone system in accordance with a preferred embodiment of the present invention.

FIG. 8 depicts a block diagram 82 illustrative of a subscription capability of a cellular telephone system in accordance with a preferred embodiment of the present invention. In an embodiment of the present invention, a service is provided via a cellular telephone network, which can be broken down into two parts: subscription and geographic location screening. Geographic location screening includes geographic location determination on origination with a determination of appropriate action to take for a given cellular telephone call. FIG. 8 shows a breakdown of various network entities involved in implementing a preferred embodiment of the present invention, and in effect providing service to a mobile station (MS).

FIG. 8 further illustrates a home location register (HLR) 86 coupled to a visiting location register (VLR) 88. HLR 86 is a location register to which a user identity may be assigned for record purposes. An example of such user identity information is subscriber information such as serial numbers, MS directory number, profile information, current location, authorization period, and so forth. HLR 86 may serve more than one mobile switching center (MSC), such as the MSC depicted in FIG. 7. HLR 86 may be distributed over more than one physical entity. VLR 88 is a location register other than an HLR, utilized by an MSC to retrieve information for handling calls to or from visiting subscribers.

VLR 88 may or may not be located within an MSC and be indistinguishable from an MSC. VLR 88 may serve more than one MSC. Connected to VLR 88 is MSC-S 90, which is an MSC that currently has the mobile switching obtaining service at one of its cell sites within its coverage area. Thus, HLR 86 provides profile information, and VLR 88 temporarily stores this profile information, while the MSC-S queries service node 84 when appropriate. Service node 84, coupled to HLR 86 and MSC-S 90, determines whether or not to allow the call to continue. Service node 84 is analogous to off-board node 80 depicted in FIG. 7.

Figure 9:
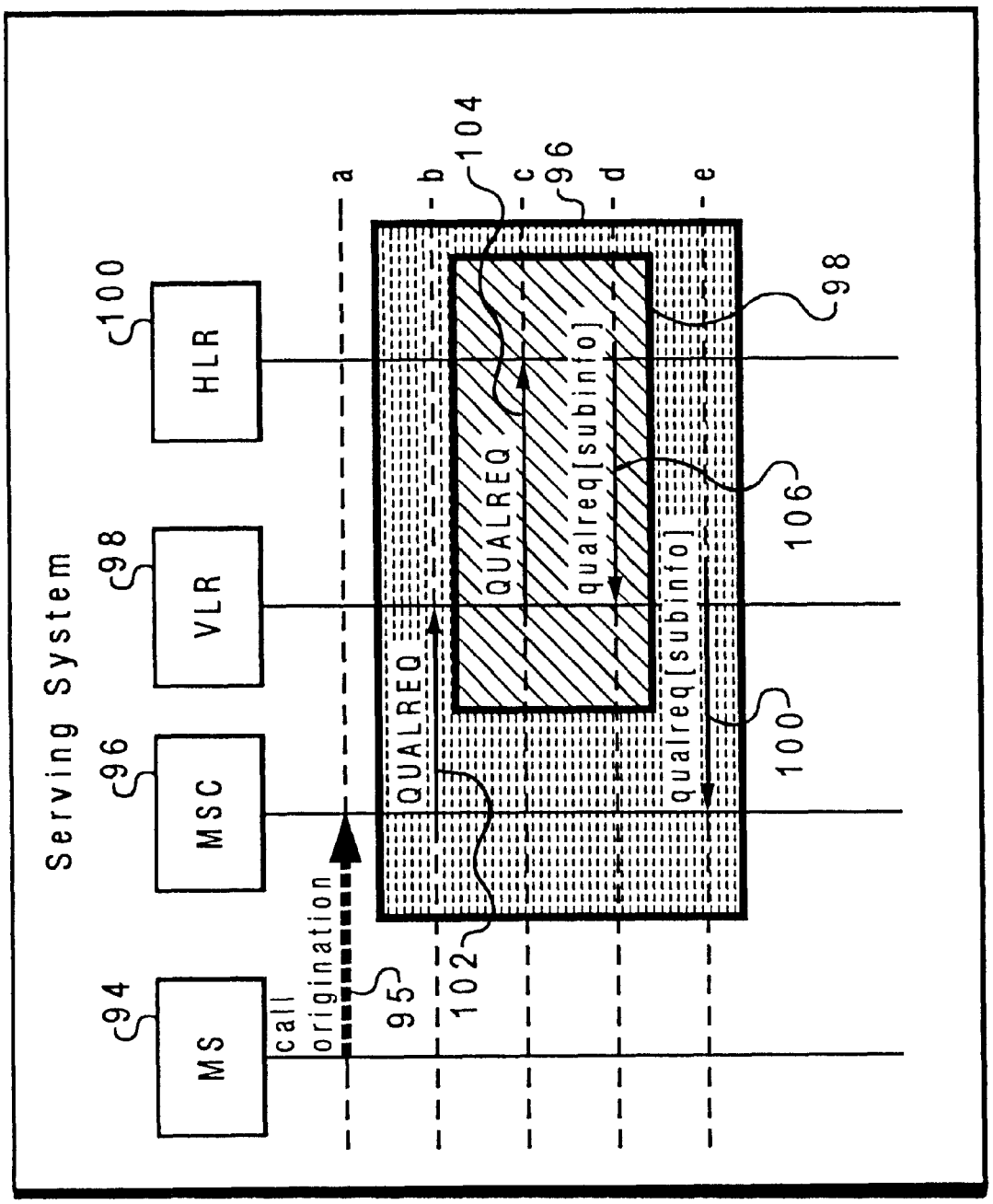
FIG. 9 illustrates a profile transfer diagram of mobile switching call originators in accordance with a preferred embodiment of the present invention.

FIG. 9 illustrates a profile transfer diagram 92 of mobile switching call originators in accordance with a preferred embodiment of the present invention. Diagram 92 includes mobile station (MS) 94, mobile switching center (MSC) 96, VLR 98, and HLR 100. Diagram 92 thus depicts the operation of a subscription service that can be utilized with a cellular telephone system. This service provides information to the various entities involved (i.e., MS, MSC, VLR, etc.) regarding which mobile stations have the new capability assigned to them.

A mobile station is essentially the cellular telephone itself. Specifically, a mobile station consists of interface equipment utilized to terminate the radio path at the user side. A mobile station provides the capabilities to access cellular telephone system services by a user (i.e., originator). The HLR and VLR are involved in this portion of the service. HLR 100 is responsible for service provisioning for the new capability. This means that HLR 100 provides an external interface that gives the HLR operator the capability to specify which mobile stations will have the new capability, and which mobile stations will not have the new capability. The new capability is, of course, a preferred embodiment of the present invention.

The external interface allows an existing cellular telephone system to implement a preferred embodiment of the present invention. The information that HLR 100 is responsible for includes which forms of toll calls require a new geographic location based restriction, and the address of the service node that should be queried in order to determine if the mobile is located within an area in which the given toll call is permitted. HLR 100 is responsible for informing VLR 98 whether a particular mobile station has been assigned this capability, the forms of toll that require the new service, and the address of the service node. VLR 98 is responsible for storing the new profile information from the enhanced profile, when HLR 100 informs VLR 98 that a mobile station has been assigned this new feature. VLR 98 is responsible for making this information available to MSC 96.

Diagram 92 depicts an example of a messaging sequence utilized by VLR 98 and HLR 100 to transfer the profile with the new information. The sequence is outlined at steps a, b, c, d, and e. As depicted at step a, serving MSC 96 receives an origination call from MS (i.e, mobile station) 94. An origination event is indicated at call origination 95. As illustrated at step b, if the profile of MS 94 is unknown to MSC 96, a "QUALREO" message is sent to VLR 98. Note that messages in all caps (e.g., "ORREQ") are invoke messages requesting that something be done. Messages in all lower case (e.g., "orreq") are return results (i.e., responses), giving the data requested or information related to what happened as a result of the request.

As depicted at step c, if the profile of the mobile station is unknown to VLR 98, VLR 98 sends a "QUALREQ," as illustrated at arrow 104, to HLR 100. As depicted at step d, HLR 100 sends a "qualreq" to the serving MSC's VLR (i.e., VLR 98). Arrow 106 specifically illustrates this step. Subscription information for the new capability is included in the information returned via the "qualreq." Finally, as depicted at step e, VLR 98 stores the subscription information and sends back the "qualreq" to the serving MSC (i.e., MSC 96). This is specifically illustrated at arrow 100.

Figure 10:
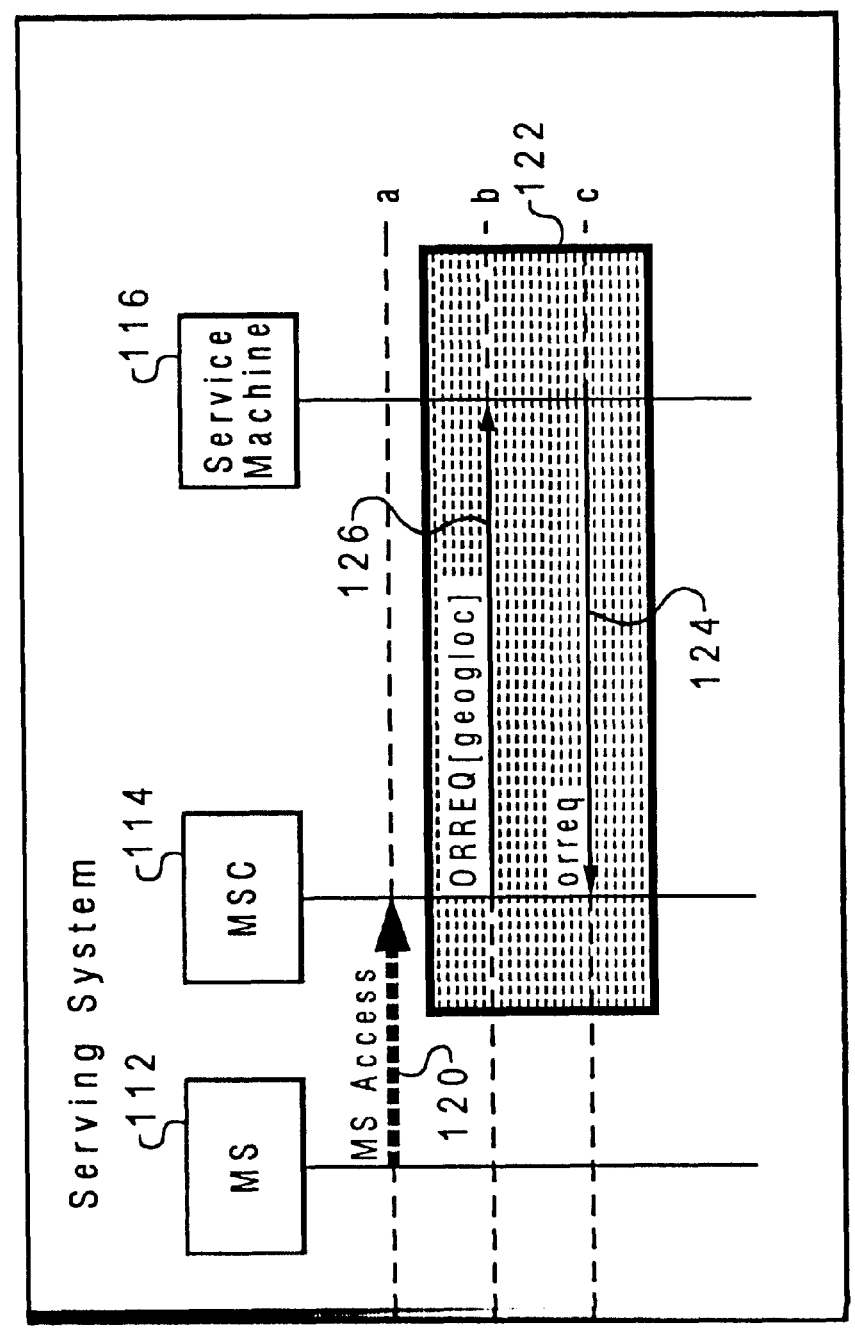
FIG. 10 depicts a "request for call instructions" diagram in accordance with a preferred embodiment of the present invention.

FIG. 10 depicts a "request for call instructions" diagram 110 in accordance with a preferred embodiment of the present invention. Diagram 110 depicts steps for determining the geographic location of the mobile station and supplying information to the new feature, and includes mobile station 112, MSC 114 and service node 116.

Diagram 110 depicts steps implementing the configuration of FIG. 7. MSC 114 is analogous to MSC 78 depicted in FIG. 7. MS 112 is analogous to cellular telephone 72 depicted in FIG. 7. Service node 116 is analogous to off-board node 80 depicted in FIG. 7. Although not specifically depicted in FIG. 10, an MSC 114 can be an MSC-S, which was described earlier. The MSC-S is responsible for analyzing the type of calls that require the capability provided by the present invention. The MSC-S also is responsible for determining the geographic location of the mobile station when needed, and further, for querying the service node to determine the appropriate action to take for a given call. The MSC-S can determine the geographic location of the mobile station in a variety of ways, including but not limited to those methods described herein (i.e., triangulation, directional antennae, GPS, etc).

Service node 116 is responsible for receiving the current geographic location of the mobile, along with the type of call, and determining how the call should be handled. As part of this function, service node 116 is responsible for maintaining geographic mapping for each mobile, and further, indicating where the mobile is allowed to operate at different levels of service. Service node 116 is also responsible for maintaining information regarding how to handle calls placed in different geographic areas. For example, a mobile might be allowed to make a call in one geographic area, blocked from making a call in another geographic area, and prompted for additional information (e.g., a PIN number) in a different geographic area.

Thus, diagram 110 show a messaging sequence that can be utilized by the MSC-S and the service node to correctly handle a call, based on the geographic location of the originator. Note that as utilized herein, the term "originator" is not necessarily synonymous with a human operator. An originator can be a human operator or an electrical device such as a computer. The term "originator" can refer to the device from which a cellular telephone call originates. Thus, assuming the human operator and the mobile cellular telephone are located close to one another, a determination of the geographic location of the mobile cellular telephone also leads to a determination of the geographic location of the human operator. If a mobile cellular telephone phone receives commands to initiate a mobile cellular telephone call via transmission media such as a radio network from a human operator located a long distance away from the mobile cellular telephone, then a determination of the geographic location of the mobile cellular telephone does not necessarily lead to an accurate determination of the geographic location of the human operator. Those skilled in the art, however, will appreciate that as currently practiced, cellular subscribers (i.e., human operators) utilize mobile cellular telephones when located near the mobile cellular telephone (e.g., punching keys on a mobile cellular telephone and placing the mobile cellular telephone near his or her mouth and ear to make a call). Thus, a determination of the geographic location of the mobile cellular telephone generally leads to a determination of the geographic location of the mobile cellular telephone user. In such instances, the term "originator" can more appropriately refer to the human operator who initiates a mobile cellular telephone call by simply pressing keys on a mobile cellular telephone.

As depicted at step a, and specifically at arrow 120, a serving MSC (i.e., MSC 114) receives an access from mobile station (MS) 112. As illustrated at step b, and specifically at arrow 126, if the profile indicates that MS 112 has the desired feature, and this feature is appropriate for the given call (e.g., international toll call trigger armed, toll call with toll call trigger armed, etc.), then the MSC must ask service node 116 how to proceed with the call.

As indicated by arrow 126, MSC 114 sends an "ORREQ" (i.e., origination request) to the service. As illustrated at step b, service node 116 accepts the "orreq" (e.g., requests what to do with a particular call). Service node 116 compares the current geographic location from which the call originates to an internal mapping maintained within service node 116. Service node 116 may consider a fixed allowed area for the mobile to make a call, or it may consider the originator's typical calling pattern, or other algorithms.

If service node 116 determines that the call may proceed, then, as illustrated at step c, service node 116 sends an "orreq," (i.e., illustrated specifically at arrow 124) that allows the call to continue. If service node 116 determines to disallow the call, an "orreq" is sent informing the originator of appropriate action to take. If service node 116 determines to invoke additional functionality to verify the identity of the mobile (e.g., PIN number, voiceprint, etc.), service node 116 then sends an "orreq" containing appropriate parameters that trigger additional functions.

The embodiments and examples set forth herein are presented in order to best explain the present invention and its practical application and to thereby enable those skilled in the art to make and utilize the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A method in a wireless communications network for restricting toll call communications to specific geographic areas in order to reduce the risk of communications fraud, said method comprising the steps of:

specifying a plurality of geographic locations within said wireless communications network at which toll calls are permitted;

determining a current geographic location of an originator of a communications transaction within said wireless communication network in response to an initiation of said communications transaction;

determining if said communications transaction is a toll call;

permitting said communication transaction to continue if said communication transaction is not a toll call;

terminating said communications transaction if said communications transaction is a toll call and said current geographic location is not among said specified plurality of geographic locations within said wireless communications network at which toll calls are permitted; and permitting said communications transactions to continue if said communications transaction is a toll call and said current geographic location is one of said specified plurality of geographic locations within said wireless communications network at which toll calls are permitted.

2. The method according to claim 1 wherein the step of determining a current geographic location of an originator of said communications transaction further comprises the step of:

determining whether said current geographic location is located within a cell of a cellular communications network.

3. The method of claim 1 wherein the step of determining a current geographic location of an originator of said communications transaction further comprises the step of:

determining a latitude and longitude of said originator.

4. The method of claim 1 wherein the step of terminating said communications transaction of said communications transaction is a toll call and said current geographic location is not among said specified plurality of geographic locations within said wireless communication network at which toll calls are permitted further comprises the steps of:

prompting an originator of said communications transaction to enter verification data;

testing said verification data for authenticity;

if as a result of testing said verification data for authenticity, said verification data is not found to be authentic, thereafter terminating said communications transaction; and if as a result of testing said verification data for authenticity, said verification data is found to be authentic, thereafter permitting said communications transaction to continue.

5. A system in a wireless communications network for restricting toll call communications to specific geographic areas in order to reduce the risk of communications fraud, said system comprising:

means for specifying a plurality of geographic locations within said wireless communications network at which toll calls are permitted;

means for determining a current geographic location of an originator of a communications transaction within said wireless communication network in response to an initiation of said communications transaction;

means for determining if said communications transaction is a toll call;

means for permitting said communication transaction to continue if said communication transaction is not a toll call;

means for terminating said communications transaction if said communications transaction is a toll call and said current geographic location is not among said specified plurality of geographic locations within said wireless communications network at which toll calls are permitted; and means for permitting said communications transactions to continue if said communications transaction is a toll call and said current geographic location is one of said specified plurality of geographic locations within said wireless communications network at which toll calls are permitted.

6. The system according to claim 5 wherein said communications transaction further comprises a cellular communications transaction.

7. The system according to claim 5 wherein said current geographic location comprises a cell within said cellular communications network.

8. The system according the claim 5 wherein said means for determining a current geographic location of an originator of a communications transaction within said wireless communications network comprises:

means for determining a latitude and longitude of said originator.

9. The system according to claim 5 wherein said means for terminating said communications transaction if said communications transaction is a toll call and said current geographic location is not among said specified plurality of geographic locations within said wireless communication network at which toll calls are permitted further comprises:

means for prompting an originator of said communications transaction to enter verification data;

means for testing said verification data for authenticity;

means for thereafter terminating said communications transaction, if as a result of testing said verification data for authenticity, said verification data is not found to be authentic; and means for thereafter permitting said communications transaction to continue, if as a result of testing said verification data for authenticity, said verification data is found to be authentic.

\* \* \* \* \*